United States Patent [19]
Roach

[11] Patent Number: 5,123,990
[45] Date of Patent: Jun. 23, 1992

[54] APPARATUS FOR FORMING THERMOPLASTIC COMPOSITE FILAMENT INTO A STRUCTURE

[75] Inventor: Henry P. Roach, Canoga Park, Calif.
[73] Assignee: Heat Transfer Technologies, Inc., Sun Valley, Calif.
[21] Appl. No.: 594,082
[22] Filed: Oct. 9, 1990

Related U.S. Application Data
[62] Division of Ser. No. 419,650, Oct. 11, 1989.

[51] Int. Cl.⁵ .............................................. B65H 54/00
[52] U.S. Cl. .................................... 156/433; 156/173; 156/446; 425/403
[58] Field of Search ............... 156/173, 167, 433, 443, 156/446; 264/281; 425/383, 402, 403

[56] References Cited
U.S. PATENT DOCUMENTS

| | | | |
|---|---|---|---|
| 2,522,526 | 9/1950 | Manning | 156/167 |
| 2,951,003 | 8/1960 | Stephens | 156/173 |
| 3,148,102 | 9/1964 | Eakins et al. | 156/173 |
| 3,449,187 | 6/1969 | Bobkowicz | 156/167 |
| 3,801,400 | 4/1974 | Vogt et al. | 156/173 |
| 3,933,557 | 1/1976 | Pall | 156/173 |
| 4,997,611 | 3/1991 | Hartmann | 156/167 |

Primary Examiner—Jay H. Woo
Assistant Examiner—W. J. Matney, Jr.
Attorney, Agent, or Firm—Gene W. Arant

[57] ABSTRACT

An applicator is utilized in applying a thermoplastic composite filament to a mandrel so as to form a structure. The filament and the surface of the mandrel are caused to move simultaneously and in a common direction relative to the applicator so that the filament is continuously fed from the applicator into engagement with the surface of the mandrel. At least one stream of heated fluid is applied to the filament so that it impinges thereon not only at location preceding the location of the applicator, but also along the length of the filament to and beyond the applicator and up to and including the region where the filament first comes into contact with the mandrel. At the same time a stream of heated fluid is applied directly to the surface of the mandrel within that region so that the mandrel is heated prior to being contacted by the filament.

9 Claims, 3 Drawing Sheets

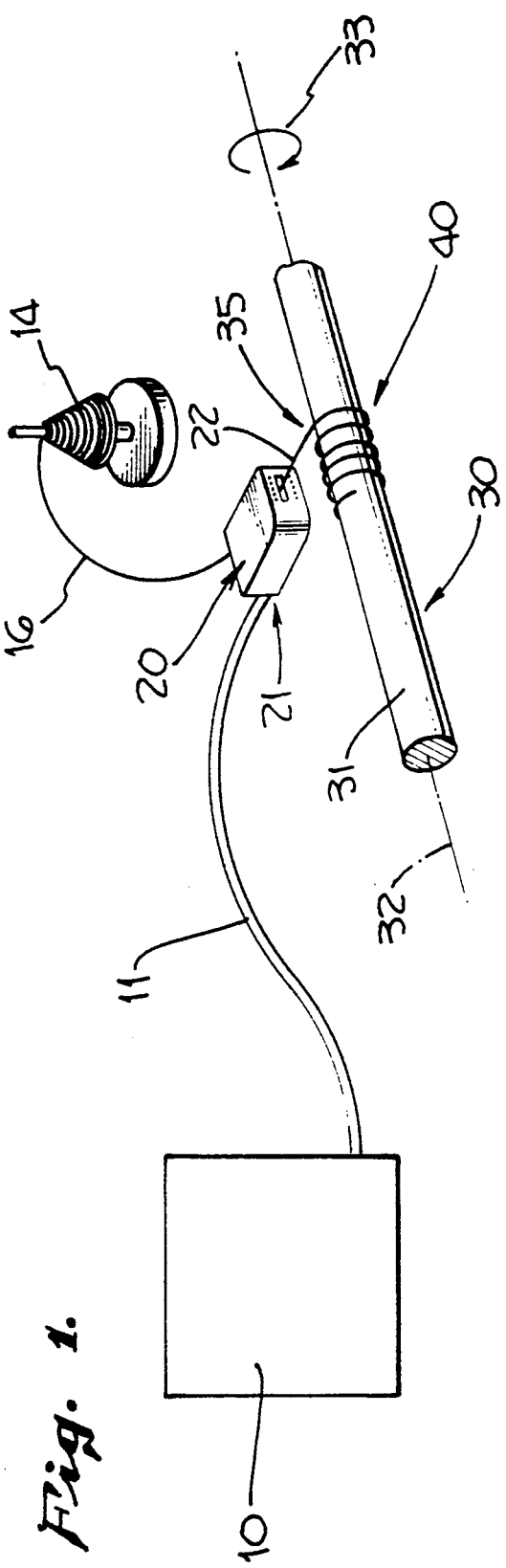
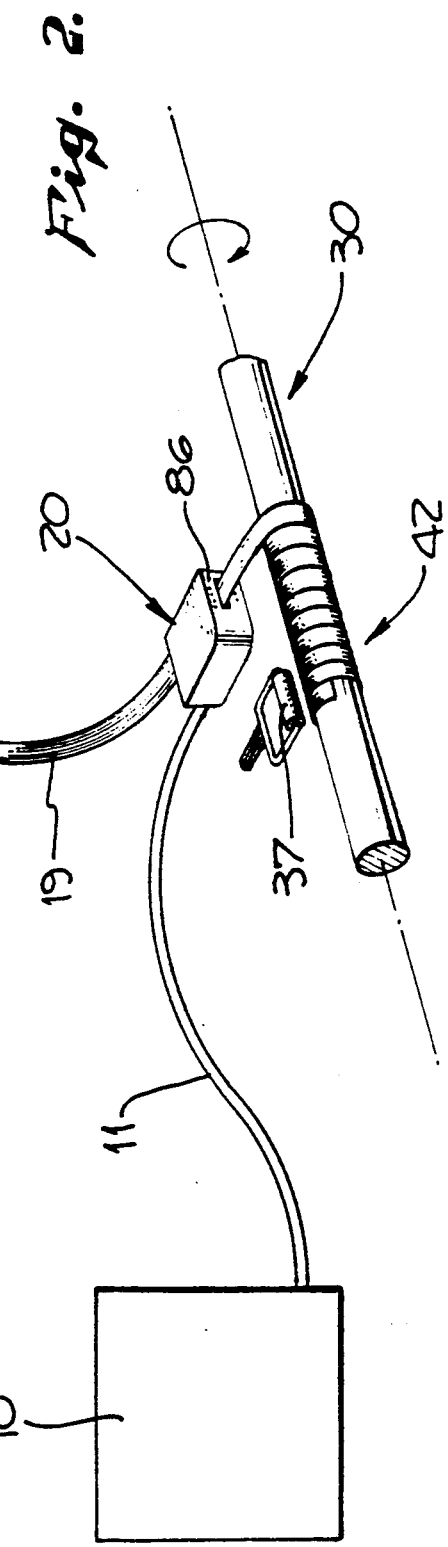

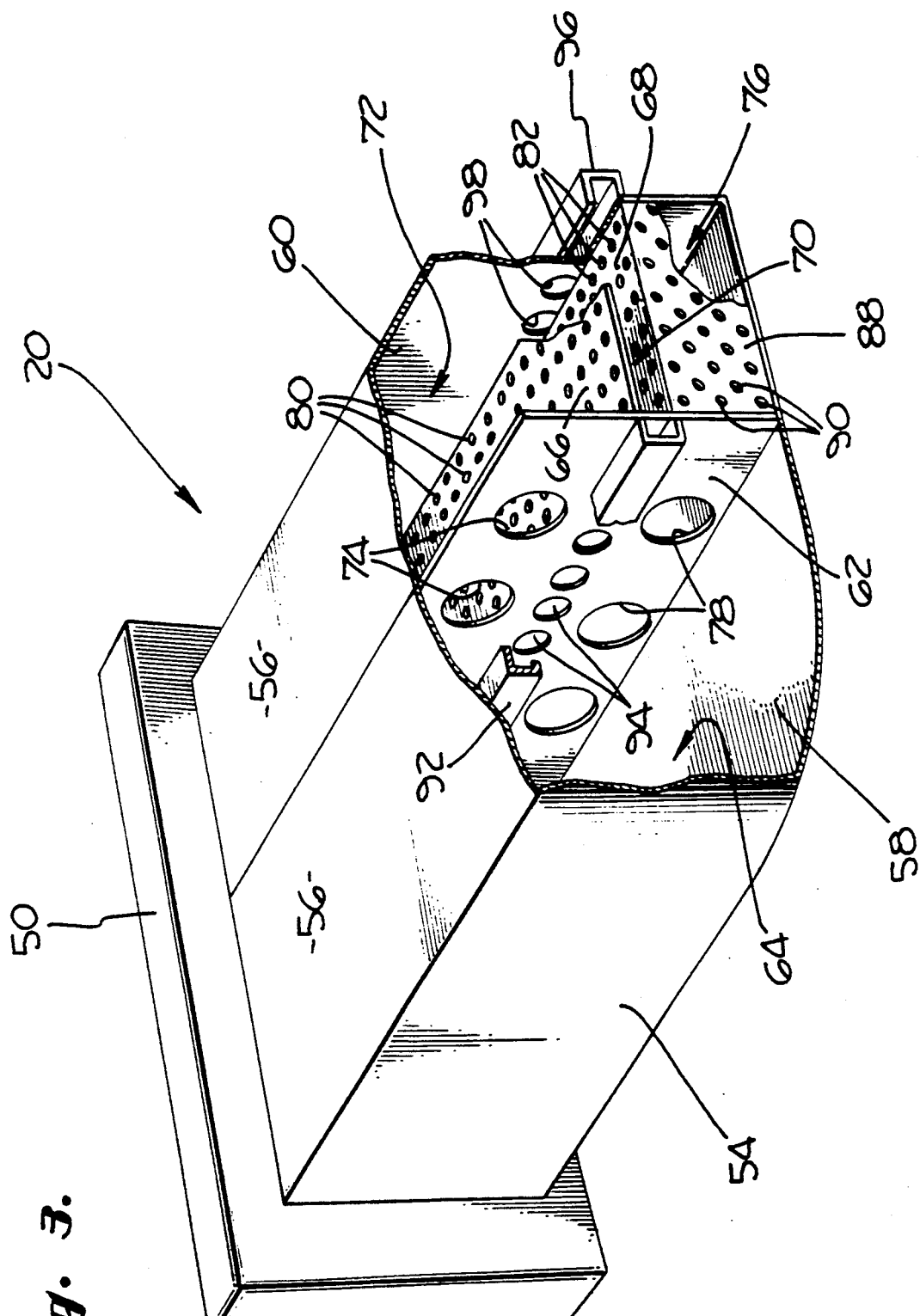

APPARATUS FOR FORMING THERMOPLASTIC COMPOSITE FILAMENT INTO A STRUCTURE

This application is a division of my prior co-pending application Ser. No. 07/419,650 filed Oct. 11, 1989.

BACKGROUND OF THE INVENTION

Composite materials are widely used to create structures that are light in weight, have great strength, and can resist high temperatures. The basic structural member is a filament or yarn which includes both a reinforcement fiber such as graphite, and another fiber that provides a matrix for supporting and positioning the reinforcement fiber.

In past years a thermoset epoxy resin has been commonly used as the matrix fiber of the filament. The thermoset material becomes chemically and permanently cross-linked when exposed to heat, hence cold storage may be required prior to its use in manufacturing a part. Recent advancements in the technology, however, have made it possible to use a thermoplastic material instead of the thermoset. Thermoplastics merely undergo a reversible phase change, from solid to liquid, when exposed to elevated temperatures, and once cooled, the thermoplastic matrix returns to its original solid phase. Some significant advantages of the thermoplastic matrix are described in an article entitled "Thermoplastic/Graphite Fiber Hybrid Fabrics" published by the Society for the Advancement of Material and Process Engineering in the SAMPE Journal, Vol. 25, No. 1, Jan/Feb 1989. Thus, the thermoplastic composite (or TPC) filament is now widely used in the industry.

A structure or part is typically created by a preliminary formation, and by then heating it in an oven to form the final part which when cooled has the rigidity of titanium or steel. That procedure can become very cumbersome and expensive, however, particularly where articles of large size are being formed.

The present invention relates to a method and apparatus for forming structures or parts from composite material, without the use of an oven, and in particular, relates to forming them from thermoplastic composite (or TCP) filament.

SUMMARY OF THE INVENTION

According to the present invention a thermoplastic composite filament is utilized in conjunction with an applicator and a mandrel to form a structure when the filament has cooled, and in a manner which facilitates the creation of the desired final form of the structure without the necessity of its being heated in an oven.

According to the method of the present invention, the filament and the surface of the mandrel are caused to move simultaneously and in a common direction relative to the applicator so that the filament is continuously fed from the applicator into engagement with the surface of the mandrel or mold. At least one stream of heated fluid is applied to the filament so that it impinges thereon not only at a location preceding the location of the applicator, but also along the length of filament to and beyond the applicator and up to and including the region where the filament first comes into contact with the mandrel. Concurrently, a stream of heated fluid is applied directly to the surface of the mandrel within that same region, so that the surface of the mandrel is heated prior to being contacted by the filament and the filament when cooled assumes the desired final form of the structure.

In the preferred form of the invention the filament, as it travels through and beyond the applicator, is subjected to heated fluid which moves transversely to the filament, in somewhat of a criss-cross path, so that the impingement of the heated fluid accomplishes a maximum amount of heat transfer into the filament.

Further according to the preferred form of the invention, the applicator is made in the form of a nozzle, and the filament passes through the nozzle in a fairly straight-line path while the heated fluid that is heating the filament is forced to flow in somewhat of a criss-cross path so as to impinge in a transverse direction upon the filament.

DRAWING SUMMARY

FIG. 1 is a perspective view of an apparatus assembly for applying a thermoplastic monofilament to a mandrel in accordance with the method o the present invention;

FIG. 2 is a perspective view like FIG. 1, but showing the thermoplastic composite material in the form of a tape rather than a single filament, and also showing the use of a roller to aid in the forming process;

FIG. 3 is a perspective view of the presently preferred form of nozzle for carrying out the invention.

DETAILED DESCRIPTION

Figure 4:
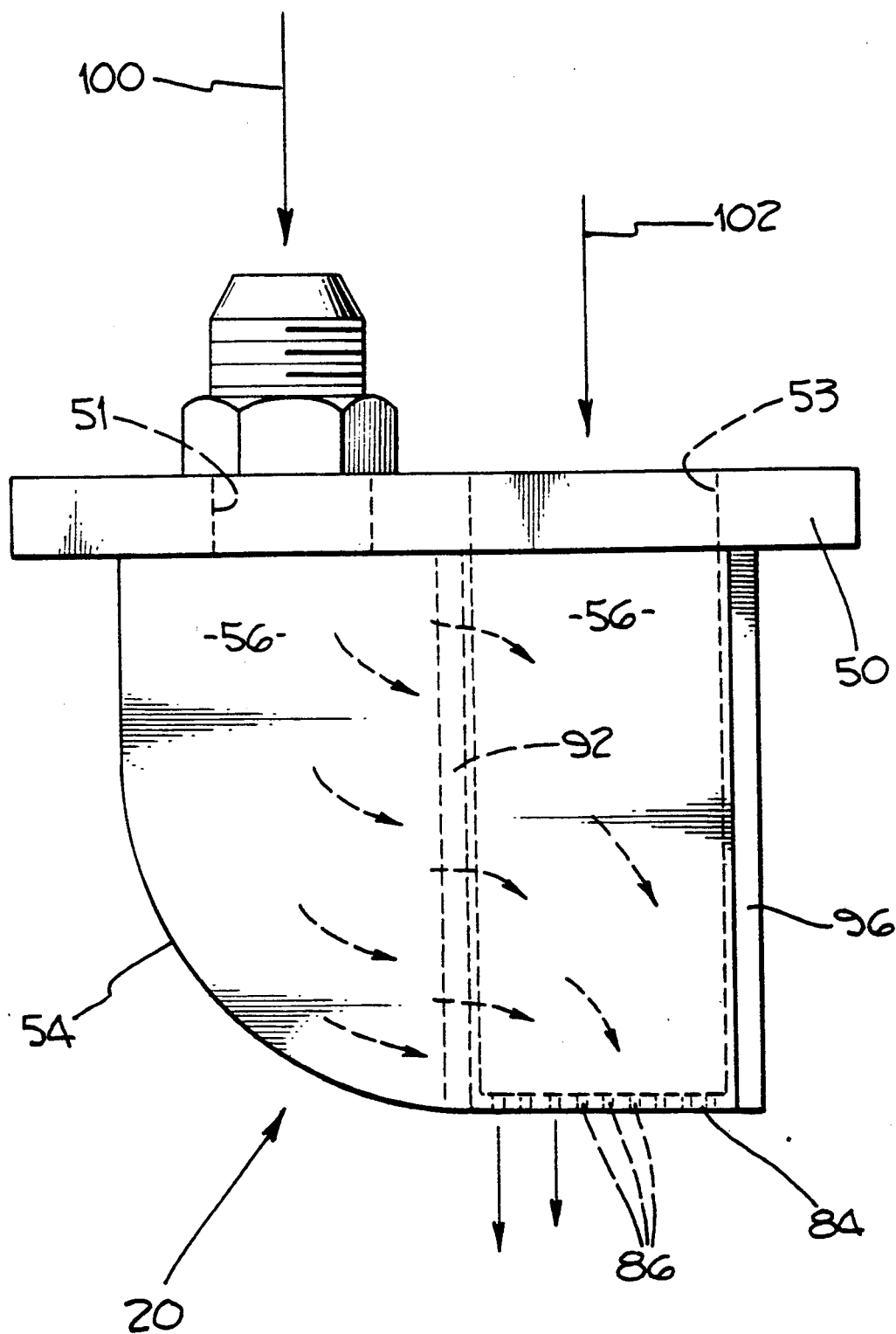
FIG. 4 is a top plan view of the nozzle, showing the air flow paths in dotted lines inside the nozzle and solid lines outside the nozzle.

Reference is now made to the drawings, FIGS. 1 through 4, inclusive, which illustrate in detail the method of the present invention and the apparatus by which it is carried out.

As shown in FIG. 1, a source 10 supplies heated air to a tube or pipe 11. The source 10 is preferably a Moen temperature control system of the type disclosed in U.S. Pat. Nos. 4,386,650 and 4,535,222. That system generates pressurized, heated air and has the ability to control the temperature level of the air output within about five degrees Fahrenheit. The hot compressed air is then fed through the tube or pipe 11 to a nozzle 20, which is of a unique design in accordance with the present invention.

The nozzle 20 has a rearward or input end 21 and a mouth or exit port 22. At its input end the nozzle is adapted to receive both a thermoplastic composite filament, and a stream of hot air for heating the filament. A source 14 having a form such as a spindle feeds a thermoplastic composite monofilament 16 to the input end of nozzle 20. The thermoplastic filament includes a reinforcement fiber such as pure graphite, as well as another fiber of a thermoplastic material which provides a matrix for supporting and positioning the reinforcement fiber. Such filaments are known in the art and are described in published articles such as the SAMPE article listed above.

A mandrel or mold 30 preferably made of stainless steel has a cylindrical surface 31 and a longitudinal axis 32. A drive means schematically illustrated at 33 drives the mandrel in rotation about its axis. After an initial length of the filament 16 has been wound about the mandrel, the driven rotation of the mandrel then pulls the filament through the nozzle, so that the filament is then continuously fed onto the surface of the mandrel or mold. The mouth 22 of the nozzle is, in effect, an applicator, since it guides the application of the filament 16 onto the mandrel. After an initial length of the filament has been wound onto the mandrel there is no slippage, hence the filament and the surface of the mandrel then move simultaneously and in a common direction relative to the applicator.

As an alternate arrangement, a Teflon-coated ring may be used to guide the filament onto the mandrel, hence the ring then becomes the applicator.

In accordance with the invention at least one stream of heated fluid is applied to the filament so that it impinges thereon not only at a location preceding the location of the applicator, but also along the length of the filament to and beyond the applicator and up to and including the region where the filament first come into contact with the mandrel. At the same time a stream cf heated fluid is applied directly to the surface of the mandrel within that region so that the mandrel is heated prior to being contacted by the filament. The region on the mandrel surface 31 where the filament first comes into contact with the mold is identified in FIG. 1 by the numeral 35. In accordance with the invention it is preferred to also apply heated air directly to that portion of the mandrel surface which has just received the filament. In that manner the heating, shaping, and cooling cycle of the thermoplastic matrix material is more effectively accommodated. The objective of the process is that the filament when cooled will assume the desired final form of the structure without the necessity of being heated in an oven.

In accordance with the embodiment of FIG. 1 the method and apparatus of the present invention are applied to the manufacture of a product 40, such as a pipe, which will have a cylindrical configuration. Although only a small number of loops about the mold are shown, it will be understood that the mandrel can also be reciprocated along its longitudinal axis in order to create a multi-layered final structure of the composite material.

The internal structure of the nozzle 22, and the flow of heated air streams therethrough, are shown in detail in FIGS. 3 and 4. Before describing the structure and operation of the nozzle in detail, however, reference is now made to FIG. 2 of the drawings.

The operation shown in FIG. 2 is much the same as that shown in FIG. 1, the main difference being that a tape 19 or ribbon rather than a filament 16 is the source of the composite material. The tape 19 consists of a large number of individual filaments 16 placed in a side-by-side relationship and secured together by adhesion of the thermoplastic matrix material. In FIG. 2 the tape source is designated as 18. The resulting structure 42 that is formed upon the mandrel 30 is a helically wound tape, rather than the helically wound single filament of FIG. 1.

Although the mandrel is shown as being of cylindrical configuration, there are other well known shapes which may also be utilized in driven rotation to form a product.

Structure and Operation of Nozzle 20

Reference is now made to FIGS. 3 and 4 which illustrate the structure and mode of operation of the nozzle 20.

Nozzle 20 includes a base member 50 having an air entrance 51 therein as shown by dotted lines in FIG. 4, and also having a tape entrance 53 shown by dotted lines. The air entrance and the tape entrance are in side-by-side but spaced-apart relationship. An air fitting 52 communicates with the air opening 51 and has the pipe or hose 11 attached to it. An arrow 100 indicates the supply of heated air that comes from the air supply 10 into the nozzle, while an arrow 102 indicates the path followed by tape 19 as it enters the nozzle.

On its left side as seen in the drawings the nozzle has a curved side wall 54. It also has flat top and bottom walls 56, 58, and a flat vertical right-hand side wall 60. Within its interior it has a dividing wall 62 which is parallel to side wall 60. As a result, the curved side wall 54, top and bottom walls 56, 58, and the dividing wall 62, form an air plenum 64 which receives the supply of heated air 100.

A pair of upper and lower horizontal walls 66, 68 extend between the dividing or center wall 62 and the right side wall 60, and are vertically separated by a short distance so as to form, in conjunction with those vertical walls, a main passageway 70. Tape 19 enters the main passageway through the tape entrance 53 and exits through the nozzle mouth 22, FIG. 1, which is the forward end of the main passageway. The space above the upper wall 66 and beneath the top wall 56 forms an upper auxiliary passageway 72, while the space below the lower wall 68 and bottom wall 58 forms a lower auxiliary passageway 76. Air flows from the plenum 64 into upper auxiliary passageway 72 through holes 74, and from the plenum 64 into lower auxiliary passageway 76 through holes 78.

The heated air then flows from upper auxiliary passageway 72 through holes 80 into the passageway 70, and through holes 82 into the main passageway. Thus, the heated air flowing along pathway 100 makes a left turn within the plenum 64, divides into upper and lower streams which enter the upper and lower auxiliary passageways, respectively, and then makes a downward turn and an upward turn from the upper and lower auxiliary passageways, respectively, into the main passageway where it impinges transversely upon the tape 19. Holes 80 are dispersed throughout the upper wall 66 in a carefully triangulated pattern so as to apply the heated air to the entire surface of the tape 19. Holes 80 are deliberately made smaller than holes 74 in order to create increased velocity of the hot air as it strikes the tape. Holes 82 are smaller than holes 78 for the same reason.

The upper auxiliary passageway is closed off by a front wall 84 (shown only in dotted lines in FIG. 4) having even smaller holes 86 which allow the air to escape in a forward direction. In similar manner the lower auxiliary passageway is closed off by a front wall 88 (shown in solid lines in FIG. 3) having equally smaller holes 90 which allow the air to escape in a forward direction. As a result, the heated air travels into the main passageway 70 in a direction transverse to the tape 19 therein, and strikes the tape transversely at various points along the length of the main passageway, so as to maximize the heat transfer into the tape. It then travels both above and below the tape 19, and in the direction of its movement. If a monofilament is being used, or if the width of the tape is significantly less than the width of passageway 70, then the hot air streams will follow somewhat of a criss-cross path, impinging transversely upon the thermoplastic material more than once.

Additional structure of the nozzle 20 includes a left channel 92 member and a right channel member 96 which are attached on the outer sides of the vertical walls 62 and 60, respectively, to provide additional internal passageways. Channel member 92 receives air from main passageway 70 via holes 94, while channel member 96 receives air from main passageway 70 via holes 98. In general, the air flowing from the two channel members impinges directly upon the surface 31 of the mandrel within the region 35 that is initially contacted by the tape 19 a it is fed to the mandrel. More specifically, the air from one channel member impinges upon that portion of the mandrel surface which is about to be engaged by the tape, while air from the other channel member strikes that portion of the tap which has just been applied to the mandrel. The importance of this air flow is that it heats the mandrel surface to a temperature which is more nearly compatible with the tape temperature, and accommodates the heating, forming, and cooling cycle of the thermoplastic matrix material. The tape presently used reaches about 750 degrees Fahrenheit before the thermoplastic material softens to a sufficient extent to permit the matrix material to reform into the desired final shape of the product.

Alternative Method

Although it is presently preferred to apply heat to the filament or tape before it reaches the nozzle mouth 22, it is possible to use a modified form of apparatus in which heat is applied only to that portion of the filament or tape which has already passed the applicator. This form of the method may, however, result in some reduction of the speed with which the product is formed.

Although the method and apparatus of the present invention have been described in considerable detail in order to comply with the patent law, it will be understood that the scope of the invention is to be limited only in accordance with the appended claims.

What I claim is:

1. Apparatus for utilizing a previously unheated thermoplastic composite filament in conjunction with an applicator and a mandrel to form a structure, in such manner that the filament is softened primarily by at least one stream of heated fluid and when cooled the filament assumes the desired final form of the structure without the necessity of being reheated in an oven, the apparatus comprising:
   means for moving the surface of the mandrel continuously relative to the applicator and for simultaneously and continuously moving the filament in the same direction as the mandrel so that the filament is continuously fed from the applicator into engagement with the surface of the mandrel;
   means for applying at least one stream of heated fluid to the filament so that the heated fluid impinges thereon not only on the entire surface area of the filament within the confines of the applicator, but also along that portion of the filament from the point where the filament exits the applicator to the point where the filament comes into contact with the mandrel; and
   means for concurrently applying a stream of heated fluid directly to the surface of the mandrel so that the surface of the mandrel is heated prior to being contacted by the filament and the filament is heated after contacting the mandrel.

2. Apparatus as in claim 1 wherein the applicator is in the form of a nozzle having a main passageway therein which guides the movement of the filament therethrough, and said means for applying at least one stream of heated fluid to the entire surface area of the filament includes at least one auxiliary interior passageway in said nozzle.

3. Apparatus as in claim 2 wherein said at least one auxiliary passageway in the nozzle directs the flow of the heated fluid to the filament such that the heated fluid impinges the filament in a transverse direction.

4. Apparatus according to claim 1 wherein the applicator is made in the form of a nozzle having a fairly straight-line passageway through which the filament passes and a criss-cross passageway for the heated fluid so that the heated fluid impinges in a transverse direction upon the filament.

5. Apparatus for applying a thermoplastic composite filament onto a rotating mandrel to form a structure, and for concurrently heating both the filament and the mandrel, comprising:
   a nozzle having a main passageway therein for guiding the filament longitudinally therethrough and onto the mandrel, and having a mouth through which the filament exits;
   means for continuously rotating the mandrel and simultaneously pulling the filament through the nozzle so that the filament is continuously fed from the mouth of the nozzle into engagement with the surface of the mandrel;
   said nozzle also having a pair of auxiliary passageways therein which extend parallel to said main passageway and have openings extending into said main passageway;
   means for applying heated fluid to said auxiliary passageways so that the heated fluid passes through said openings into said main passageway and impinges upon the entire surface area of the filament not only within the confines of said nozzle but also upon that portion of the filament which has already exited the nozzle as well as that portion of the mandrel where the filament is contacting the mandrel; and
   additional passageway means in said nozzle for concurrently applying heated fluid directly to the surface of the mandrel within the region where the filament is contacting the mandrel.

6. Apparatus as claimed in claim 5 wherein said main passageway of said nozzle is of a rectangular cross-section whose width is much greater than its height and is thereby capable of guiding a tape that consists of a plurality of filaments in a side-by-side relationship.

7. Apparatus as claimed in claim 5 wherein the mandrel is of cylindrical configuration, and said means for rotating the mandrel causes the mandrel to rotate about its longitudinal axis such that a cylindrical product is formed by accumulating the filament on the mandrel.

8. Apparatus as claimed in claim 5 wherein the mandrel is of cylindrical configuration, said means for rotating the mandrel causes the mandrel to rotate about its longitudinal axis, and wherein said main passageway of said nozzle is of a rectangular cross-section whose width is much greater than its height and is thereby capable of guiding a tape that consists of a plurality of filaments in a side-by-side relationship.

9. Apparatus for forming a structure from previously unheated thermoplastic composite filament, the filament being simultaneously heated, directed, and consolidated by the apparatus into the shape of the structure, the apparatus comprising:
   an applicator;
   a rotatable mandrel having a longitudinal axis;

means for rotating said mandrel about its longitudinal axis to thereby pull the filament through said applicator and into engagement with said rotating mandrel;

said applicator comprising;

(a) a main passageway of rectangular cross-section whose width is much greater than its height, said main passageway having parallel opposing upper and lower horizontal walls separated by parallel opposing left and right vertical dividing walls, said main passageway having a mouth at one end thereof;

(b) a base forming the rearward portion of said applicator and having an entrance communicating with the other end of said main passageway for receiving a tape or a filament, said main passageway being adapted for movement of a tape or filament therethrough, to then exit from said mouth;

(c) a plenum extending from said base and having a separate entrance for receiving a heated fluid and keeping it at a pressure above atmospheric pressure;

(d) upper and lower auxiliary passageways extending from said base, each bounded by respective upper and lower horizontal walls of said main passageway;

(e) means communicating from said plenum into said auxiliary passageways for permitting the heated fluid to flow into said auxiliary passageways;

(f) each of said auxiliary passageways having a closed forward wall having a plurality of holes therein, so that a portion of the heated fluid is forced through said holes in a direction substantially parallel to the exiting filament and envelops the exiting filament;

(g) said upper and lower horizontal walls each having a plurality of holes therein, such that heated fluid flows from the respective holes of said auxiliary passageway into said main passageway and hence into transverse impingement upon the entire surface area of the filament then moving along said main passageway, the heated fluid then escaping through said mouth in a direction substantially parallel to the filament exiting therefrom;

(h) left and right channels extending from said base, each bounded by the respective vertical dividing walls of said main passageway;

(i) means for communicating heated fluid from said main passageway into said left and right channels; and (j) said left and right channels being without restriction at their forward ends such that heated fluid escaping therefrom impinges the surface of said mandrel as well as any filament residing thereon.

* * * * *